United States Patent
Pi (10) Patent No.: US 10,068,123 B2
(45) Date of Patent: Sep. 4, 2018

(54) FINGERPRINT SENSOR AND ELECTRONIC DEVICE HAVING THE SAME

(71) Applicant: ELECTRONICS AND TELECOMMUNICATIONS RESEARCH INSTITUTE, Daejeon (KR)

(72) Inventor: Jae-Eun Pi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/380,415

(22) Filed: Dec. 15, 2016

(65) Prior Publication Data

US 2017/0177922 A1 Jun. 22, 2017

(30) Foreign Application Priority Data

Dec. 18, 2015 (KR) .................. 10-2015-0181868
Jul. 6, 2016 (KR) .................. 10-2016-0085799

(51) Int. Cl.
*G06K 9/28* (2006.01)
*G06K 9/00* (2006.01)

(52) U.S. Cl.
CPC ....... *G06K 9/00053* (2013.01); *G06K 9/0002* (2013.01); *G06K 9/00087* (2013.01)

(58) Field of Classification Search
CPC ................................ G06K 9/0002
See application file for complete search history.

(56) References Cited

U.S. PATENT DOCUMENTS

| 4,429,413 A * | 1/1984 | Edwards | A61B 5/1172 257/E27.006 |
| 2013/0196683 A1 | 8/2013 | Ahn et al. | |
| 2013/0314148 A1* | 11/2013 | Kang | G06K 9/0002 327/517 |
| 2014/0266262 A1 | 9/2014 | Taghibakhsh | |
| 2015/0022670 A1* | 1/2015 | Gozzini | G06K 9/0002 348/187 |
| 2015/0117154 A1 | 4/2015 | Kwak | |
| 2017/0140194 A1* | 5/2017 | Qin | G06K 9/0002 |

OTHER PUBLICATIONS

N.D. Young et al., "Novel Fingerprint Scanning Arrays Using Polysilicon TFT's on Glass and Polymer Substrates", IEEE Electron Device Letters, vol. 18, No. 1, Jan. 1997, pp. 19-20. (Year: 1997).*

* cited by examiner

*Primary Examiner* — Brian Werner (57) ABSTRACT

Provided is a fingerprint sensor. The fingerprint sensor according to an embodiment of the inventive concept includes a plurality of transmission lines, a plurality of receive lines, and a sensor array including sensor units connected to the plurality of transmission lines. Each of the sensor units includes a switch transistor having a gate terminal and one terminal, which are commonly connected to a corresponding transmission line of the plurality of transmission lines and a sensor transistor connected between the other end of the switch transistor and a corresponding receive line of the plurality of receive lines. The sensor transistor performs a current suppression on in response to a voltage of a virtual gate that is touched by a fingerprint.

14 Claims, 8 Drawing Sheets

FINGERPRINT SENSOR AND ELECTRONIC DEVICE HAVING THE SAME

CROSS-REFERENCE TO RELATED APPLICATIONS

This U.S. non-provisional patent application claims priority under 35 U.S.C. § 119 of Korean Patent Application Nos. 10-2015-0181868, filed on Dec. 18, 2015, and 10-2016-0085799, filed on Jul. 6, 2016, the entire contents of which are hereby incorporated by reference.

BACKGROUND

The present disclosure herein relates to a fingerprint sensor and an electronic device including the same.

Capacitive type fingerprint sensors are classified into mutual capacitive types that sense a decrease in mutual capacitance due to a finger contacting a touch point and self capacitive types that sense an increase in self capacitance.

In the case of the self capacitive types according to the related art, a magnitude of capacitance generated when contacting the fingerprint has to be high so as to accurately discriminate capacitance values generated between ridges of the fingerprint, which are contact points, and valleys of the fingerprint, which correspond to spaces between the ridges. Therefore, accurate sensing may be enabled when sensors are placed as many as possible between the ridges and the valleys. However, when the sensor increases in size due to an increase of a size of a contact surface, sensing performance may be deteriorated.

SUMMARY

The present disclosure provides a fingerprint sensor having high performance and an electronic device including the same.

An embodiment of the inventive concept provides a fingerprint sensor for including: a plurality of transmission lines; a plurality of receive lines; and a sensor array having sensor units connected to the plurality of transmission lines, wherein each of the sensor units includes: a switch transistor including a gate terminal and one terminal, which are commonly connected to a corresponding transmission line of the plurality of transmission lines; and a sensor transistor connected between the other end of the switch transistor and a corresponding receive line of the plurality of receive lines, wherein the sensor transistor perform a current suppression in response to a voltage of a virtual gate that is touched by a fingerprint.

In an embodiment, the fingerprint sensor may further include a transmission line control unit that controls the plurality of transmission lines.

In an embodiment, the transmission line control unit may apply a power voltage to the transmission line during 1 hour so that the switch transistor is turned on and apply a ground voltage during two hours after the one hour so that the switch transistor is turned off.

In an embodiment, the fingerprint sensor may further include comparators respectively connected to the plurality of receive lines to compare a voltage of a corresponding transmission line to a reference voltage, and thereby to generate an output value corresponding to the comparison result value.

In an embodiment, the sensor transistor may be disposed on a backplane layer, and a passivation layer may be disposed on a floating gate terminal of the switch transistor, wherein the passivation layer includes the virtual gate.

In an embodiment, a cover glass layer may be disposed on the passivation layer, and the cover glass layer may include the virtual gate.

In an embodiment, the sensor transistor may be disposed on a passivation layer, and a backplane layer including the virtual gate may be disposed on the sensor transistor.

In another embodiment of the inventive concept, a fingerprint sensor includes: a plurality of transmission lines; a plurality of receive lines; a plurality of power lines; and a sensor array including sensor units connected to the plurality of transmission lines, wherein each of the sensor units includes: a switch transistor comprising a gate terminal connected to a corresponding transmission line of the plurality of transmission lines and one terminal connected to a corresponding power line of the plurality of power lines, a sensor transistor connected between the other terminal of the switch transistor and a corresponding receive line of the plurality of receive lines, wherein the sensor transistor perform a current suppression on in response to a voltage of a virtual gate that is touched by a fingerprint.

In an embodiment, a power voltage may be applied to each of the plurality of power lines when a sensing operation is performed.

In an embodiment of the inventive concept, an electronic device includes: a touch screen sensor configured to sense a fingerprint and display data; and a control unit configured to control the touch screen, wherein the touch screen includes a fingerprint sensor having a sensor transistor and a switch transistor connected to one terminal of the sensor transistor, and the sensor transistor perform a current suppression on in response to a voltage of a virtual gate configured to is touched by a fingerprint.

In an embodiment, the fingerprint sensor may further include a receive line connected to the other terminal of the sensor transistor.

In an embodiment, the fingerprint sensor may further include a transmission line configured to supply current to the receive line in response to the turn-on operation of the sensor transistor, and each of a gate terminal and the other terminal of the switch transistor is connected to the transmission line.

In an embodiment, the fingerprint sensor may further includes a power line configured to supply current to the receive line in response to the turn-on operation of the sensor transistor, wherein one terminal of the switch transistor is connected to the transmission line, and the other terminal of the switch sensor is connected to the power line.

In an embodiment, a passivation layer may be disposed on the sensor transistor and a cover glass layer may be disposed on the passivation layer, and the cover glass layer may include the virtual gate.

In an embodiment, a backplane layer may be disposed on the sensor transistor, and the backplane layer may include the virtual gate.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, embodiments of the inventive concept will be described clearly and in detail with reference to the accompanying drawings in such a manner that a person with ordinary skill in the art to which the embodiment of the inventive concept pertains easily carry out. Since embodiments of the inventive concept may be diversely modified and have various forms, embodiments are exemplified in the drawings and are described in detail in the specification. However, this does not limit embodiments of the inventive concept within specific disclosed embodiments, and all the modifications, equivalents, and replacements within the idea and technical scope of the embodiment of the inventive concept may be included.

Figure 1:
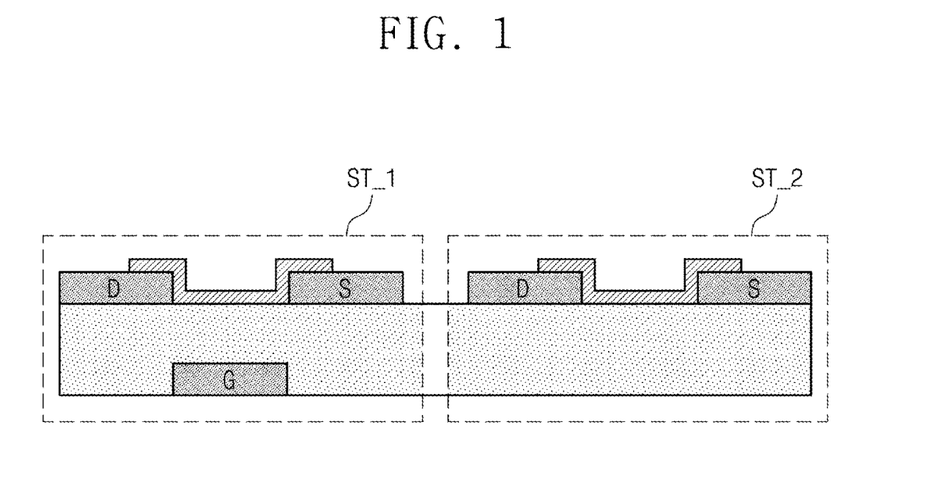
FIG. 1 is a view for explaining a concept according to an embodiment of the inventive concept.

FIG. 1 is a view for explaining a concept according to an embodiment of the inventive concept. Referring to FIG. 1, two sensor transistors ST_1 and ST_2 are provided.

The first sensor transistor ST_1 includes a drain terminal D, a source terminal S, and a gate terminal G. The first sensor transistor ST_1 includes the gate terminal G that is patterned. Hereinafter, for convenience in description, it is assumed that the gate terminal G contacts a ridge when a fingerprint is touched.

On the other hand, the second sensor transistor ST_2 does not include a gate terminal unlike the first sensor transistor ST_1. Hereinafter, it is assumed that the second sensor transistor ST_2 meets a valley when the fingerprint is touched.

Figure 2:
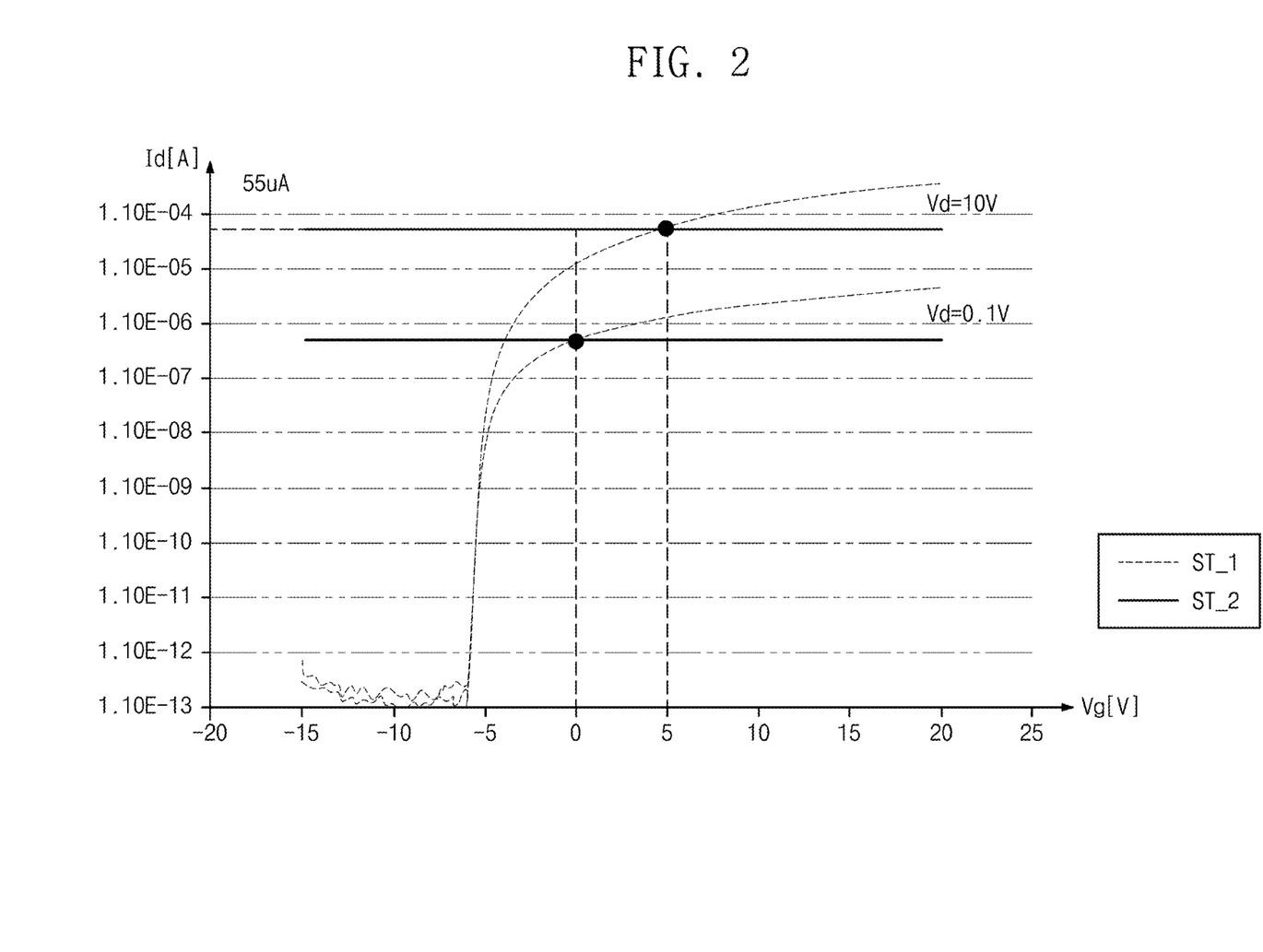
FIG. 2 is a view illustrating an example of transfer curves of sensor transistors of FIG. 1.

FIG. 2 is a view illustrating an example of transfer curves of the sensor transistors ST_1 and ST_2 of FIG. 1. Referring to FIG. 2, in case of the first sensor transistor ST_1, current values at voltages of about 0.1V and about 10V are measured while a gate terminal is swept at a drain voltage from about −15V to about 20V. In case of the second sensor transistor ST_2, current values are measured two times at drain voltages of about 0.1V and about 10V because a gate terminal is not provided.

Referring to FIG. 2 again, in the case that the drain voltage is about 0.1V, the gate voltage has about 0V. However, when the drain voltage is about 10V, although the gate of the second sensor transistor ST_2 is not provided, an effect as if the gate voltage of about 5V is applied may be obtained. Therefore, it is seen that an intermediate voltage of about 5V is generated between the drain terminal and the source terminal, and current greater about five times than that corresponding to about 0V is transmitted. That is, the sensor transistor may perform a current suppression on in response to a voltage of a virtual gate that is touched by a fingerprint. Also, the above-described characteristics may be confirmed from the output characteristics (output curve).

Figure 3:
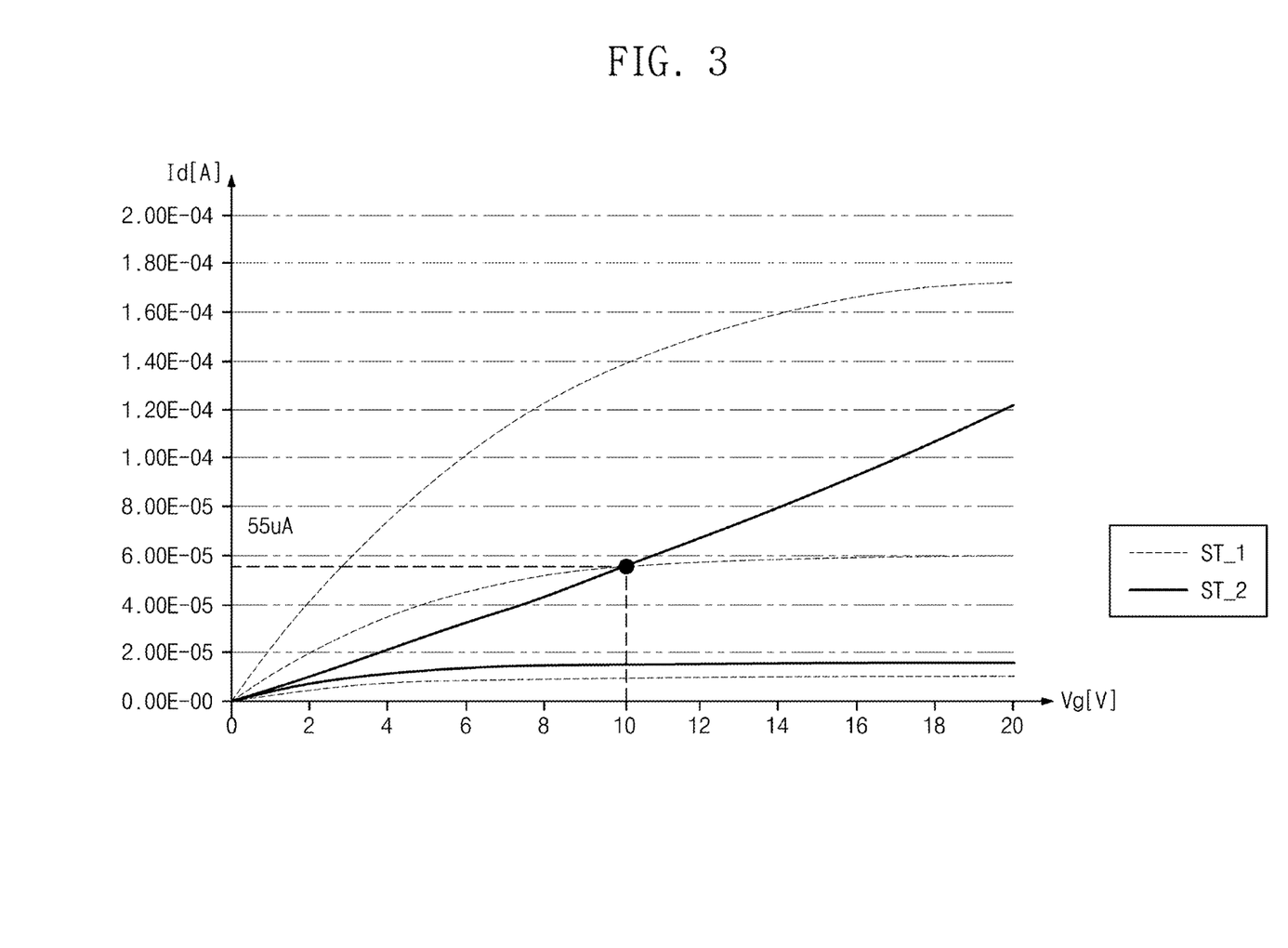
FIG. 3 is a view illustrating an example of output curves of sensor transistors of FIG. 1.

FIG. 3 is a view illustrating an example of the transfer curves of the sensor transistors ST_1 and ST_2 of FIG. 1. Referring to FIG. 3, the characteristics of the first sensor transistor ST_1 represent results measured at the drain voltages of about 0V, about 5V, and about 10V when the drain voltages are swept from about 0V to about 20V.

Here, when about 10V is applied to the drain terminal D of the second sensor transistor ST_2, it is seen that a current value corresponds to that (~55 uA) when the gate voltage of the first sensor transistor ST_1 is about 5V, like the result confirmed in the transmission characteristics explained in FIG. 2. On the other hand, when a measurement probe tip contacts the gate terminal G of the first sensor transistor ST_1, and a line is separated from a measurement device to provide an effect as if a line capacitance of several tens pF is given, it is seen that current corresponding to 0V output characteristics flows through the first sensor transistor ST_1.

Figure 4:
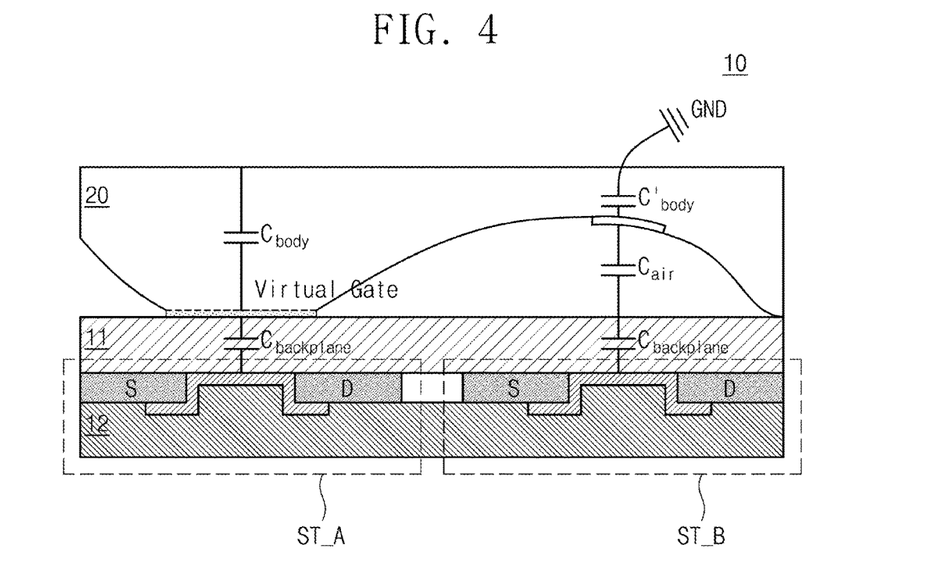
FIG. 4 is a view illustrating an example of a fingerprint sensor having a virtual gate according to an embodiment of the inventive concept.

FIG. 4 is a view illustrating an example of a fingerprint sensor having a virtual gate according to an embodiment of the inventive concept. Referring to FIG. 4, in the case of a sensor transistor ST_A, the ridge of the fingerprint is touched to generate a virtual gate. Also, an electric potential corresponding to about 0V may be maintained at the gate terminal due to a body capacitor (Cbody) of the finger.

On the other hand, in the case of a sensor transistor ST_B, the sensor transistor ST_B meets the valley of the fingerprint, but not in a contact with the fingerprint. Thus, an effect of the virtual gate does not exist. Since the drain voltage drops to apply a voltage of about 5V to a channel of the sensor transistor ST_B, much more current may flow when compared to the sensor transistor ST_A which the ridge contacts.

According to an embodiment, a backplane layer 11 used in a device process may be realized with general glass. According to another embodiment, a backplane layer 11 may be realized with gorilla glass or sapphire glass having higher permittivity.

According to an embodiment, a source terminal S and a drain terminal D of the sensor transistors ST_A and ST_B may be disposed on a passivation layer 12.

Also, FIG. 4 illustrates a structure in which the virtual gate is generated on a region of the backplane layer 11 which the fingerprint touches. However, the embodiment of the inventive concept is not limited thereto. In the fingerprint sensor according to the embodiment of the inventive concept, the virtual gate may be generated on a region that touches the passivation layer.

Figure 5:
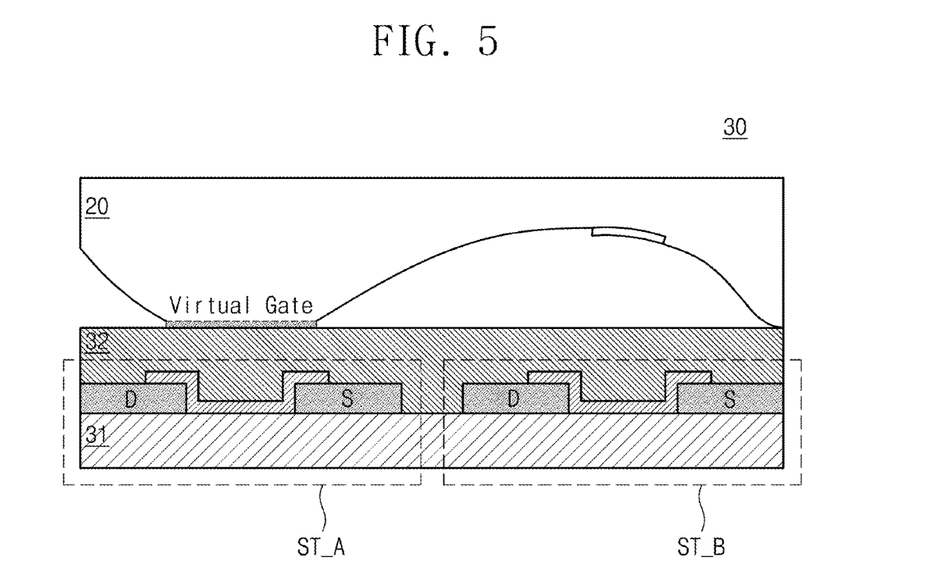
FIG. 5 is a view illustrating an example of a fingerprint sensor having a virtual gate according to another embodiment of the inventive concept.

FIG. 5 is a view illustrating an example of a fingerprint sensor having a virtual gate terminal according to another embodiment of the inventive concept. Referring to FIG. 5, a fingerprint sensor 30 has a structure in which the fingerprint touches a passivation layer 32 unlike that of FIG. 4. The fingerprint sensor 30 may include a backplane layer 31, sensor transistors ST_A and ST_B disposed on the backplane layer 31, and the passivation layer 32 disposed on a drain terminal D and a source terminal S of the sensor transistors ST_A and ST_B.

Also, in the fingerprint sensor 30 illustrated in FIG. 5, the fingerprint touches the passivation layer 32 to generate the virtual gate. The embodiment of the inventive concept is not limited thereto. The fingerprint sensor according to the embodiment of the inventive concept may further include a cover glass layer on the passivation layer.

Figure 6:
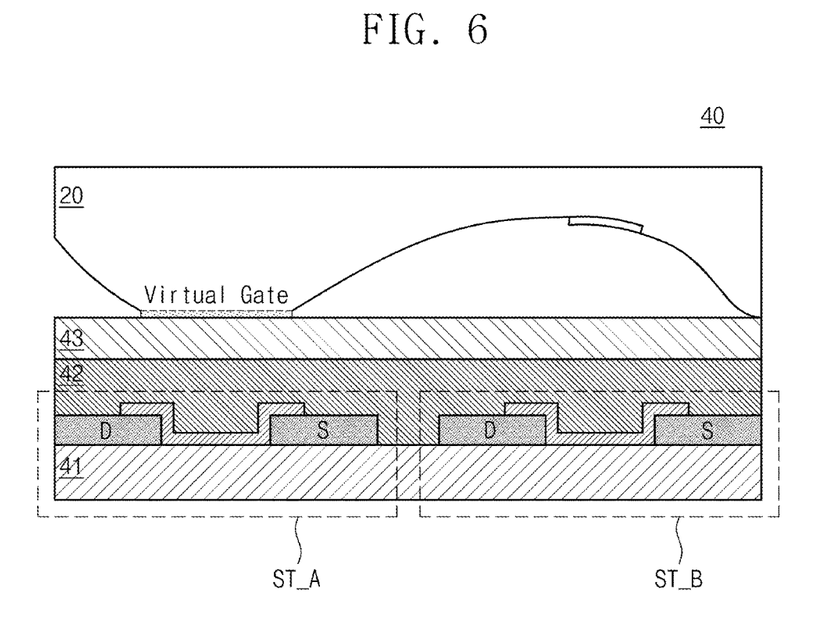
FIG. 6 is a view illustrating an example of fingerprint sensor having a virtual gate according to a further embodiment of the inventive concept.

FIG. 6 is a view illustrating an example of a fingerprint sensor having a virtual gate according to further embodiment of the inventive concept. Referring to FIG. 6, a fingerprint sensor 40 may further include a cover glass layer 43 when compared to that of FIG. 5. The cover glass layer 43 may be disposed on the passivation layer 42. The fingerprint sensor 40 may include a backplane layer 41, sensor transistors ST_A and ST_B disposed on the backplane layer 41, the passivation layer 42 disposed on a drain terminal D and a source terminal S of the sensor transistors ST_A and ST_B, and the cover glass layer 43 disposed on the passivation layer 42. The fingerprint touches the cover glass layer 43 to generate a virtual gate.

In a general fingerprint sensor, a sensor having a relatively large area is realized to increase a size of a self capacitor that is generated when the fingerprint is touched. On the other hand, since the virtual gate type fingerprint sensor according to the embodiment of the inventive concept controls current that flows through a thin film transistor to be touched, the self capacitor may not be required to significantly decrease an area of the sensor.

Also, the general fingerprint sensor requires a fast scanning technique in which integration calculation are performed several thousands times to read a small size self capacitance. Therefore, a high-performance external integrated circuit is needed. On the other hand, in the fingerprint sensor according to the embodiment of the inventive concept, since the thin film transistor allows a large amount of current to flow at a time, the integration calculation is unnecessary. Thus, since a current difference between the ridge and valley is obvious, determination error is significantly lowered.

The fingerprint sensor according to the embodiment of the inventive concept utilizes a method in which the gate is generated when contacting the ridge and the gate is not generated when facing the valley so that a current difference of the thin film transistor is generated to clarify the current difference sensed between the ridge and the valley.

Figure 7:
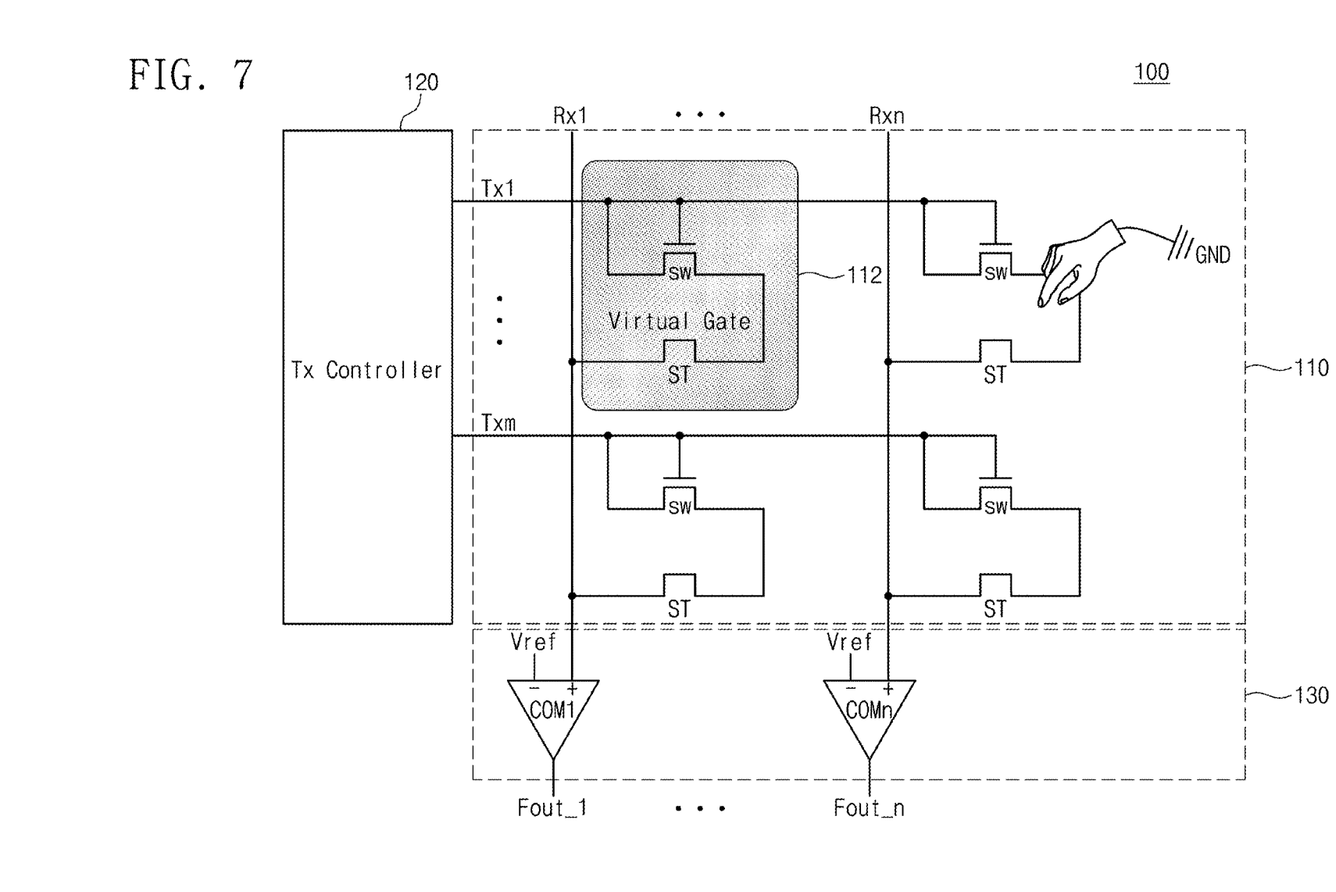
FIG. 7 is a view illustrating an example of a fingerprint sensor having a sensor array according to an embodiment of the inventive concept.

FIG. 7 is a view illustrating an example of a fingerprint sensor having a sensor array according to an embodiment of the inventive concept. Referring to FIG. 7, a fingerprint sensor 100 may include a sensor array 110, a transmission line controller 120, and a receive line controller 130.

The sensor array 110 may include a plurality of sensor units 112 arranged on regions in which a plurality of transmission lines (Tx1 to Txm, where the m is an integer equal to or greater than two) intersect with a plurality of receive lines (Rx1 to Rxn, where the n is an integer equal to or greater than two).

The sensor unit 112 may include a switch transistor SW and a sensor transistor ST. The switch transistor SW may include a gate terminal and one terminal which are connected to the transmission line Tx1. The sensor transistor ST may be connected between the other terminal of the switch transistor SW and the receive line Rx1. The sensor transistor ST may be realized in the same manner as the sensor transistor illustrated in FIGS. 1 to 5 to have the virtual gate when the fingerprint is touched.

The transmission line controller 120 may be realized to control the transmission lines Tx1 to Txm. Each of the transmission lines Tx1 to Txm may have a voltage to turn-on the switch transistor SW when performing a sensing operation and thereafter may have a voltage to turn-off the switch transistor SW when transmitting detected information (current) to the corresponding receive lines Rx1 to Rxn.

The receive line controller 130 may include comparators COM1 to COMn respectively connected to the receive lines Rx1 to Rxn. The comparators COM1 to COMn may be realized to output output-values Fout_1 to Fout_n by comparing each of voltages of the transmission lines Rx1 to Rxn to a reference voltage Vref. Here, each of the output-values Fout_1 to Fout_n may indicate whether the fingerprint is in open or contact state.

In the fingerprint sensor 100 according to the embodiment of the inventive concept, a current difference sensed between the ridge or valley may be obvious through a method in which the floated gate terminal is coupled-up from an external data signal.

Also, each of the receive lines Rx1 to Rxn illustrated in FIG. 7 is supplied with current from each of the corresponding transmission lines Tx1 to Txm depending on whether the fingerprint is touched. However, the embodiment of the inventive concept is not limited thereto. Also, each of the receive lines Rx1 to Rxn according to the embodiment of the inventive concept may be realized to receive current from each of separating power lines depending on whether the fingerprint is touched.

Figure 8:
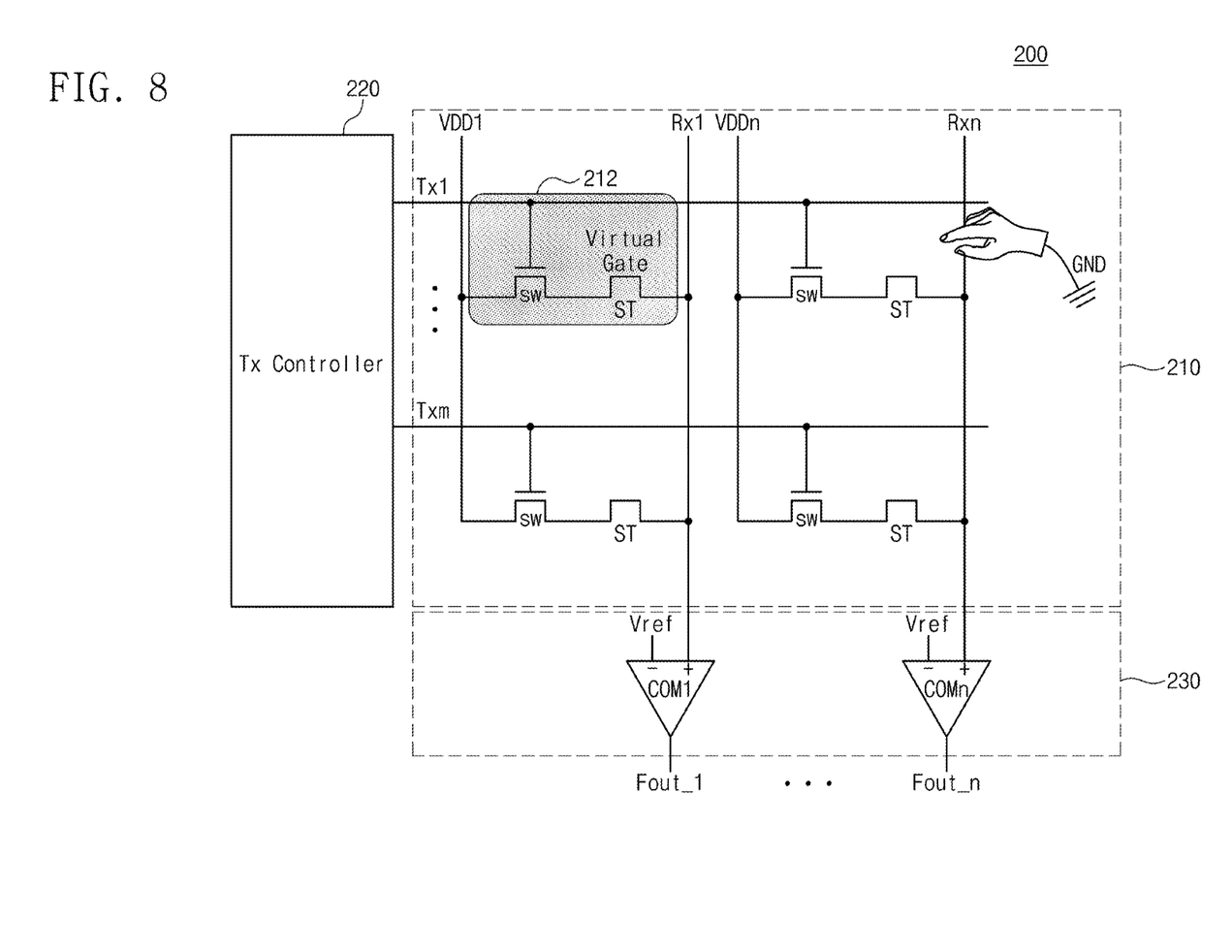
FIG. 8 is a view illustrating an example of a fingerprint sensor having a sensor array according to another embodiment of the inventive concept.

FIG. 8 is a view illustrating an example of a fingerprint sensor having a sensor array according to another embodiment of the inventive concept. Referring to FIG. 8, a fingerprint sensor 200 may include a sensor array 210, a transmission line controller 220, and a receive line controller 230.

The sensor array 210 may include a plurality of sensor units 212 arranged on regions in which a plurality of transmission lines (Tx1 to Txm, where the m is an integer equal to or greater than two) intersect with a plurality of receive lines (Rx1 to Rxn, where the n is an integer equal to or greater than two).

The sensor unit 212 may include a switch transistor SW and a sensor transistor ST. The switch transistor SW may include a gate terminal connected to the transmission line Tx1 and one terminal connected to a power line VDD1. The sensor transistor ST may be connected between the other terminal of the switch transistor SW and the receive line Rx1. The sensor transistor ST may be realized in the same manner as the sensor transistor illustrated in FIGS. 1 to 5 when a virtual gate is generated when the fingerprint is touched.

The transmission line controller 220 may be realized to control the transmission lines Tx1 to Txm. Each of the transmission lines Tx1 to Txm may have a voltage to turn-on the switch transistor SW when performing a sensing operation and then may have a voltage to turn-off the switch transistor SW when transmitting sensed information (current) to the corresponding receive lines Rx1 to Rxn.

The receive line controller 230 may include comparators COM1 to COMn respectively connected to the receive lines Rx1 to Rxn. The comparators COM1 to COMn may be realized to output output-values Fout_1 to Fout_n by comparing each of voltages of the transmission lines Rx1 to Rxn to a reference voltage Vref. Here, each of the output-values Fout_1 to Fout_n may indicate whether the fingerprint is in open or contact state.

Figure 9:
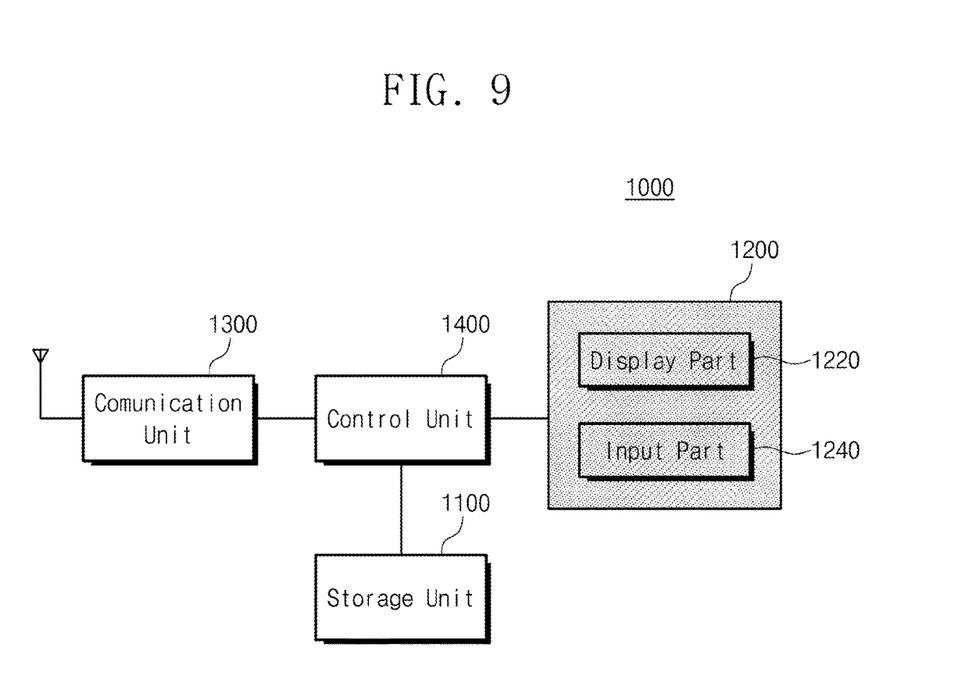
FIG. 9 is a view illustrating a structure of an electronic device provided with a touch screen sensor according to an embodiment of the inventive concept.

FIG. 9 is a view illustrating a structure of an electronic device provided with a touch screen sensor according to an embodiment of the inventive concept. Here, an electronic device 1000 may be various digital devices such as mobile phones including smart phones, camera devices, MP3 terminals, and tablet and laptop computers. Referring to FIG.

9 the electronic device 1000 may include a storage unit 1100, a touch screen sensor 1200, a communication unit 1300, and a control unit 1400.

The touch screen sensor 1200 may include a display part 1220 and an input part 1240. The display part 1220 may display all kinds of information processed in the electronic device 1000. Here, the display part 1220 may be realized by display devices such as a liquid crystal display (LCD), an organic light emitting diode (OLED), or a light emitting diode (LED). The input part 1240 may sense an input for controlling an operation of the electronic device 1000 and a touch input for inputting data. Here, the touch input may include general touch inputs such as a finger and/or a pen touch and accurate touch inputs such as a fingerprint sensing and the like requiring high resolution touch sensitivity. The input part 1240 may be realized by the fingerprint sensor as explained in FIGS. 1 to 8.

The storage unit 1100 may be provided with a program memory that stores an operating program of the electronic device 1000 and a program according to an embodiment of the inventive concept and a data memory that stores information to be processed.

The communication unit 1300 performs a wireless communication function with a base station, an internet server, and the like. Here, the communication unit 1300 may be constituted by a transmitting part that serves as a frequency up converter for a transmitting signal and amplifies power and a receiving part that amplifies a receiving signal with low noise and serves as a frequency down converter. The communication unit 1300 may be provided with a modulating part and a demodulating part. Here, the modulating part modulates the transmitting signal and transmits the signal to the transmitting part, and the demodulating part demodulates the signal received through the receiving part. In this case, the modulating and demodulating part may be a long term evolution (LTE), a wideband code division multiple access (WCDMA), a global system for mobile communications (GSM), and the like. Also, the modulating and demodulating part may be a WIFI, an world interoperability for microwave access (WIMAX), and the like. Furthermore, the modulating and demodulating part may be a near field communication NFC, a Bluetooth, and the like.

The control unit 1400 controls overall operations of the electronic device 1000 and particularly controls the touch screen sensor 1200 to perform sensing of touch inputs such as a pen and/or a finger touch and sensing of high resolution touch inputs such as a fingerprint and the like.

In the electronic device 1000 including the above-described constituents, the touch screen sensor 1200 may include the display part 1220 and the input part 1240 for sensing the touch inputs. The input part 1240 may be explained as the touch sensor, and the touch sensor may sense whether the finger and/or pen are in touch and sense detail information according to the touch.

The fingerprint sensor according to the embodiment of the inventive concept may remove a self-capacitance region by making the transistor itself included in the sensor into the input sensor to realize a much higher DPI than the self-capacitance fingerprint sensor and may significantly improve the fingerprint sensing performance by obviously discriminate between the ridge and valley of the fingerprint with the difference of current that flows from the thin film transistor.

The fingerprint sensor and the sensing method thereof according to the embodiment of the inventive concept utilizes the capacitive coupling technique to control an amount of current flowing through the thin film transistor, thereby significantly reducing the area of the sensor. At the same time, differences between the ridge and the valley may be more clearly sensed.

Also, the above-described embodiments of the inventive concepts are only specific embodiments to realize the embodiments of the inventive concept. The embodiment of the inventive concept may include means itself that are specific and actually used and also include abstract and conceptual technical ideas to be utilized as technology in the future.

What is claimed is:

1. A fingerprint sensor comprising:
   a plurality of transmission lines;
   a plurality of receive lines; and
   a sensor array having sensor units connected to the plurality of transmission lines,
   wherein each of the sensor units includes:
      a switch transistor having a gate terminal and one terminal, which are commonly connected to a corresponding transmission line of the plurality of transmission lines; and
      a sensor transistor connected between the other terminal of the switch transistor and a corresponding receive line of the plurality of receive lines, one of a source terminal and a drain terminal of the sensor transistor being connected to the switch transistor, a gate of the sensor transistor being a virtual gate that is generated when a finger touches the sensor unit, and
   wherein the sensor transistor suppresses a current when the virtual gate exists.

2. The fingerprint sensor of claim 1, further comprising a transmission line control unit configured to control the plurality of transmission lines.

3. The fingerprint sensor of claim 2, wherein the transmission line control unit applies a power voltage to the transmission line during one hour so that the switch transistor is turned on and applies a ground voltage during two hours after the one hour so that the switch transistor is turned off.

4. The fingerprint sensor of claim 3, further comprising comparators respectively connected to the plurality of receive lines, and configured to compare a voltage of a corresponding transmission line to a reference voltage, and to generate an output value corresponding to the comparison result value.

5. The fingerprint sensor of claim 1, wherein the sensor transistor is disposed on a backplane layer, and
   a passivation layer is disposed on a floating gate terminal of the switch transistor,
   wherein the passivation layer includes the virtual gate.

6. The fingerprint sensor of claim 1, wherein the sensor transistor is disposed on a backplane layer,
   a passivation layer is disposed on a floating gate terminal of the switch transistor, and
   a cover glass layer is disposed on the passivation layer,
   wherein the cover glass layer includes the virtual gate.

7. The fingerprint sensor of claim 1, wherein the sensor transistor is disposed on a passivation layer, and
   a backplane layer is disposed on the sensor transistor,
   wherein the backplane layer includes the virtual gate.

8. An electronic device comprising:
   a touch screen sensor configured to sense a fingerprint and display data; and
   a control unit configured to control the touch screen sensor, wherein the touch screen sensor includes a fingerprint sensor having a sensor transistor and a switch transistor, one of a source terminal and a drain terminal of the sensor transistor being connected to one terminal of the switch transistor, wherein a gate of the sensor transistor is a virtual gate that is generated when a finger touches the touch screen sensor, and wherein the sensor transistor suppresses a current when the virtual gate exists.

9. The electronic device of claim 8, wherein the fingerprint sensor further comprises a receive line connected to the other one of the source terminal and the drain terminal of the sensor transistor.

10. The electronic device of claim 9, wherein the fingerprint sensor further comprises a transmission line configured to supply a current to the receive line in response to a turn-on operation of the switch transistor, and each of a gate terminal and the other terminal of the switch transistor is connected to the transmission line.

11. The electronic device of claim 9, wherein the fingerprint sensor further comprises a power line configured to supply current to the receive line in response to the turn-on operation of the sensor transistor, wherein one terminal of the switch transistor is connected to the transmission line, and the other terminal of the switch is connected to the power line.

12. The electronic device of claim 9, wherein a passivation layer is disposed on the sensor transistor, and a cover glass layer is disposed on the passivation layer, and wherein the cover glass layer comprises the virtual gate.

13. The electronic device of claim 9, wherein a backplane layer is disposed on the sensor transistor, and the backplane layer comprises the virtual gate.

14. The fingerprint sensor of claim 1, further comprising comparators respectively connected to the plurality of receive lines, and configured to compare a voltage of a corresponding transmission line to a reference voltage, and to generate an output value corresponding to the comparison result value.

* * * * *